(12) United States Patent
Soo et al.

(10) Patent No.: US 8,767,937 B2
(45) Date of Patent: *Jul. 1, 2014

(54) SYSTEM AND METHOD TO DETECT NOISY CONNECTIONS ON A TELEPHONIC CONFERENCE BRIDGE

(71) Applicant: AT&T Legal Department-Roebuck, Patent Docketing, Bedminster, NJ (US)

(72) Inventors: Armstrong Soo, San Ramon, CA (US); Bernard Ku, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/689,555

(22) Filed: Nov. 29, 2012

(65) Prior Publication Data

US 2013/0208873 A1    Aug. 15, 2013

Related U.S. Application Data

(63) Continuation of application No. 12/632,898, filed on Dec. 8, 2009, now Pat. No. 8,355,490.

(51) Int. Cl.
    *H04M 3/42* (2006.01)
(52) U.S. Cl.
    USPC .... 379/202.01; 455/416; 709/204; 348/14.08
(58) Field of Classification Search
    USPC ..................................... 379/202.01; 370/260
    See application file for complete search history.

(56) References Cited

U.S. PATENT DOCUMENTS

| 6,721,411 | B2 | 4/2004 | O'Malley |
| 7,016,315 | B2 | 3/2006 | Armbruster |
| 7,519,347 | B2 | 4/2009 | Winsvold |
| 7,545,923 | B1 | 6/2009 | Campion |
| 2009/0097677 | A1 | 4/2009 | Shaffer |

OTHER PUBLICATIONS

Kathleen Fisher, Robert Gruber, Pads:a domain-specific language for processing ad hoc data, ACM Sigplan Notices, Jun. 2005, p. 295-304, Val. 40 Issue 6, ACM, New York, NY.

Qian Xi, Kathleen Fisher, David Walker, Kenny Zhu, ad Hoc Data and the Token Ambiguity Problem, Lecture Notes in computer Science, 2009, p. 91-106, vol. 5418, Springer-Veriag, Berlin, Heidelberg.

(Continued)

*Primary Examiner* — Joseph J Nguyen
(74) *Attorney, Agent, or Firm* — G. Michael Roebuck

(57) ABSTRACT

A non-transitory computer readable medium is disclosed containing instructions for execution by a computer, the computer program comprising: instructions to for detect a noise level on a conference telephone call; instructions to reconnect a first end user device to a first data line and sending a message to the first end user device indicating that the first end user device is a source of noise and to reconnect to a conference server using a second end user device in response to determining that the noise is reduced by disconnecting the first end user device from the first data line; and instructions to reconnect the first end user device to the first data line and determining if the noise is reduced in response to determining that the noise is not reduced by disconnecting the first end user device from the first data line. A system and method are also disclosed.

20 Claims, 2 Drawing Sheets

(56) References Cited

OTHER PUBLICATIONS

Jay Early, An efficient contest-free parsing algorithm, Feb. 1970, p. 94-102, vol. 13, Issue 2, ACM, New York, NY.

Kathleen Fisher, David Walker, Kenny Zhu, Petter White, From dirt to shovels fully automatic tool generation from ad hoc data, POPL, Jan. 2008, p. 421-434, Session 12, ACM, New York, NY.

Kathleen Fisher, David Walker, Kenny Zhu, Incremental Learning of System Log Formats, WASL, Oct. 2009, p. 1-41, vol. 12, Issue 3, ACM, New York, NY.

SYSTEM AND METHOD TO DETECT NOISY CONNECTIONS ON A TELEPHONIC CONFERENCE BRIDGE

CROSS REFERENCE TO RELATED APPLICATIONS

This patent application is a continuation of and claims priority from U.S. patent application Ser. No. 12/632,898 filed on Dec. 8, 2009 by Soo et al., entitled A COMPUTER PROGRAM PRODUCT AND METHOD TO DETECT NOISY CONNECTIONS ON A TELEPHONIC CONFERENCE BRIDGE which is hereby incorporated by reference in its entirety.

FIELD OF THE DISCLOSURE

The present disclosure relates to the detection and mitigation of noise levels on telephonic conference calls.

BACKGROUND OF THE DISCLOSURE

The present disclosure describes a computer program product and method to detect noisy connections on an audio conference bridge. An illustrative embodiment enables the computer program product and method to single out noisy connections for mitigation without affecting innocent users. Audio conferencing has become a major business productivity tools. Many companies prefer audio conferencing over traveling. Participants are often frustrated when there is noise on the line but cannot identify the source(s). This becomes a major inconvenience and obstacle to productivity when all participants are told to disconnect and re-join, just to find out that the noise is still there. The frustration level increases in proportion to the size of the bridges.

Asking participants to mute their phones often do not solve the problem because the culprit may not be the devices but the connection, such as poor wireless signal reception and cross-talk on wire. Sometimes, the participants simply forgot to mute the line and stepped away. Hosts can mute all participants but it will significantly impede discussion, which is the main purpose of having conference calls.

DETAILED DESCRIPTION

Figure 1:
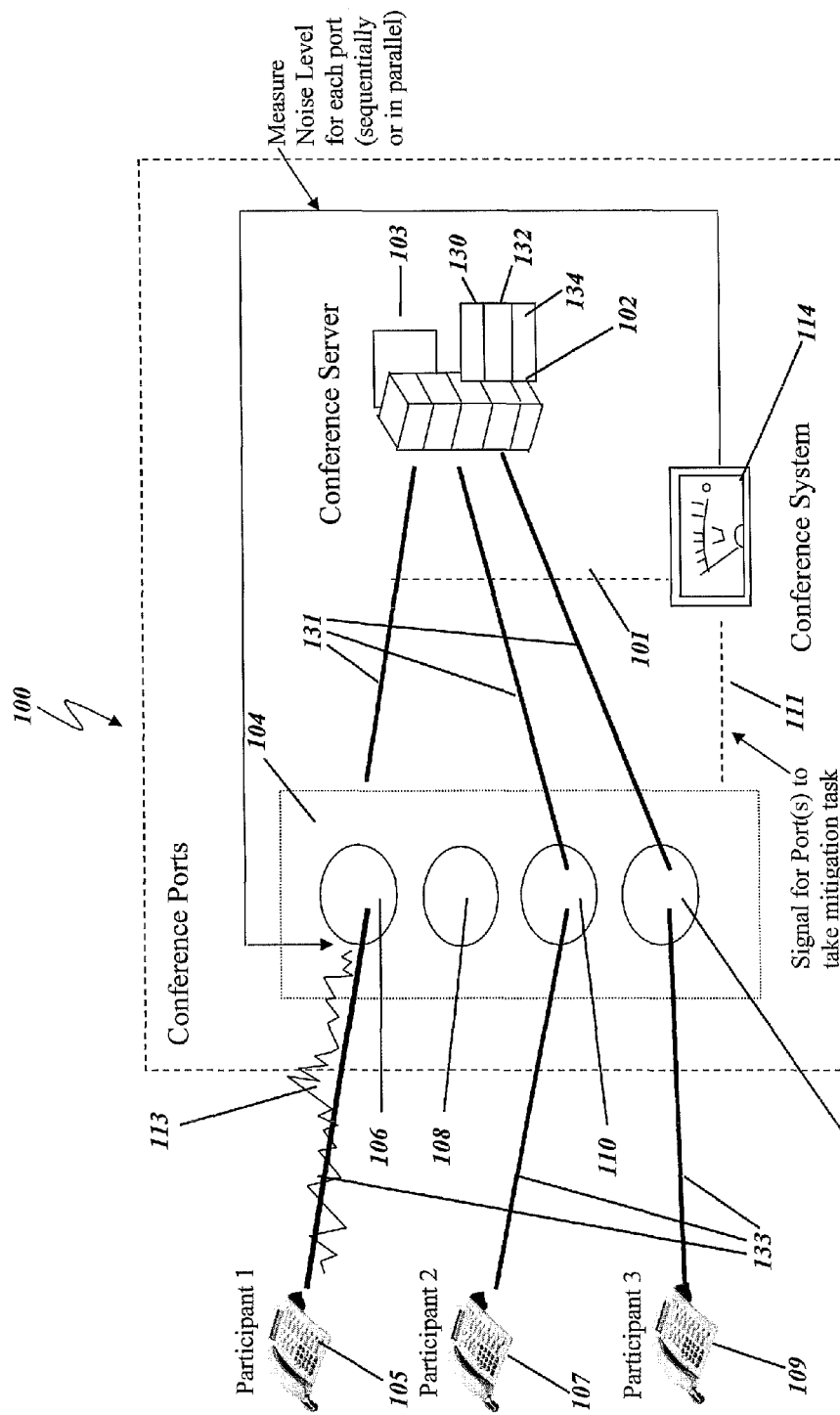
FIG. 1 depicts an illustrative embodiment of a computer program product for delivering advertising data.

In an illustrative embodiment, when there is noise on a conference port connected to a conference participant's telephone line during a conference bridge call that cannot be resolved by voluntary muting, a conference host can request computer program product based Noise Control feature (an illustrative embodiment of which is described herein) by, for example, dialing *99. In response, the computer program product will play an audio announcement to all participants that Noise Control is in process and request all participants to be quiet, or refrain from talking. The computer program product and method will then measure a noise level for each conference bridge port connection.

In an illustrative embodiment, the computer program product and method will compare the noise measurement against a baseline threshold and identify the connection (s) that exceed threshold, i.e. noisy connections. The computer program product will then take predetermined mitigation steps. Subsequently, the computer program product will play another audio announcement to the remaining participants that Noise Control is completed and they may resume conversation.

In a particular illustrative embodiment, a method is disclosed for controlling a noise level on a conference bridge telephone call, the method including but not limited to establishing via a first conference server, a plurality of two-way telephonic communication end user device connections between a plurality of end user devices and a plurality of conference ports, wherein each of the plurality of conference ports are in data communication with the first conference server; measuring a noise level on each one of the end user device connections; detecting a noisy ehd user device connection having a noise level above a threshold level on at least one of the plurality of end user device connections; identifying the noisy end user device connection; and taking predetermined mitigation steps to reduce the noise from the noisy end user device connection.

In another particular embodiment of the method, each one of the end user device connections, further includes, but is not limited to, a first data line between a first one of the plurality of end user devices and a first one of the plurality of conference ports, and a second data line between the first one of the plurality of conference ports and the first conference server, the method further including but not limited to, disconnecting a first end user device from a first data line between the first one of the end user devices and the first one of the conference ports; determining if the noise is reduced by disconnecting the first end user device from the first data line; if the noise is reduced by disconnecting the first end user device from the first data line, reconnecting the first end user device to the first data line and sending a message to the first end user device indicating that the first end user device is a source of noise and to reconnect to the conference bridge server using a second end user device; else if the noise is not reduced by disconnecting the first end user device from the first data line, reconnecting the first end user device to the first data line between first end user device and the first conference port and determining if the noise is reduced; and if the noise is not reduced by reconnecting the first end user device to the first data line between first end user device and the first conference port; else, disconnecting first conference port from the server, and measuring a noise level for the first participant on a first connection between the first conference port and the server and rerouting the first end user device to a second conference port; if the noise is not reduced by disconnecting first conference port from the first conference server, rerouting the first end user device connection to a second conference port on the server.

In another particular embodiment of the method, the method further includes but not limited to playing an announcement on the plurality of end user devices requesting a period of silence before the measuring the noise on the plurality of end user device connections. In another particular embodiment of the method, the method further includes but not limited to playing an announcement on the plurality of end user devices announcing that the measuring the noise is complete and withdrawing the request for a period of silence. In another particular embodiment of the method, the method further includes but not limited to accepting a user input datum from one of the end user devices at the server requesting noise control on the conference bridge telephone call.

In another particular embodiment of the method, the measuring the noise level is performed by an electronic device. In another particular embodiment of the method, the measuring the noise level is evaluated by a first person listening to a first one of the plurality of end user devices. In another particular embodiment of the method, the measuring the noise level is evaluated by a second person listening to a second one of the plurality of end user devices.

In another particular embodiment, a computer readable medium is disclosed containing embedded instructions that when executed by a computer perform a method useful in controlling a noise level on a conference bridge telephone call, the computer program including but not limited to instructions to establish via a first conference server, a plurality of two-way telephonic communication end user device connections between a plurality of end user devices and a plurality of conference ports, wherein each of the plurality of conference ports are in data communication with the first conference server; instructions to measure a noise level on each one of the end user device connections; instructions to detect a noisy end user device connection having a noise level above a threshold level on at least one of the plurality of end user device connections; instructions to identify the noisy end user device connection; and instructions to take predetermined mitigation steps to reduce the noise from the noisy end user device connection.

In another particular embodiment of the medium, each one of the end user device connections, further includes but is not limited to a first data line between a first one of the plurality of end user devices and a first one of the plurality of conference ports and a second data line between the first one of the plurality of conference ports and the first conference server, the computer program further includes but not limited to instructions to disconnect a first end user device from a first data line between the first one of the end user devices and the first one of the conference ports; instructions to determine if the noise is reduced by disconnecting the first end user device from the first data line; instructions to, if the noise is reduced by disconnecting the first end user device from the first data line, instructions to reconnect the first end user device to the first data line and instructions to send a message to the first end user device indicating that the first end user device is a source of noise and instructions to reconnect to the conference bridge server using a second end user device; else if, the noise is not reduced by disconnecting the first end user device from the first data line, instructions to reconnect the first end user device to the first data line between first end user device and the first conference port and instructions to determine if the noise is reduced; and if the noise is not reduced by reconnecting the first end user device to the first data line between first end user device and the first conference port, else, disconnecting first conference port from the server, and measuring a noise level for the first participant on a first connection between the first conference port and the server and rerouting the first end user device to a second conference port; if the noise is not reduced by disconnecting first conference port from the first conference server, instructions to reroute the first end user device connection to a second conference port on the server. In another particular embodiment of the medium, the computer program further includes is but not limited to instructions to play an announcement on the plurality of end user devices requesting a period of silence before the measuring the noise on the plurality of end user device connections. In another particular embodiment of the medium, the computer program further includes but is not limited to instructions to play an announcement on the plurality of end user devices announcing that the measuring the noise is complete and withdrawing the request for a period of silence. In another particular embodiment of the medium, the computer program further includes but not limited to instructions to accept a user input datum from one of the end user devices at the server requesting noise control on the conference bridge telephone call.

In another particular embodiment of the medium, the measuring the noise level are performed by an electronic device. In another particular embodiment of the medium, the measuring the noise level is evaluated by a first person listening to a first one of the plurality of end user devices. In another particular embodiment of the medium, the measuring the noise level is evaluated by a second person listening to a second one of the plurality of end user devices.

Turning now to FIG. 1, FIG. 1 depicts an illustrative embodiment 100 in which a first conference server 102 and second conference server are provided. Each conference server and end user device includes a processor 130, memory for data storage in a computer readable medium 132 and a data base 134. A first plurality of data lines 131 are provided, each of one the data lines 131 connects the first conference server to one of a plurality of conference ports 106, 108, 110 and 112. A second plurality of data lines 133 is also provided. Each of the second plurality of data lines 133 connects one of a plurality of end user devices 105, 107 and 109 to one of the conference ports 106, 108, 110 and 112. A conference telephone caller conference participant listens and communicates with other participants using the end user devices during a conference call. The end user devices, can be a telephone, cell phone, or another device capable of participating on a conference telephone call. A noise measurement device 114 measures noise on a selected data line 131, 133, conference port or end user device to determine a source of noise. As shown in FIG. 1, noise 113 exists on the data line 133 connecting end user device 105 and conference port 106. The method and computer program product determine a source of noise during a conference call and perform the method described herein to mitigate the noise.

Figure 2:
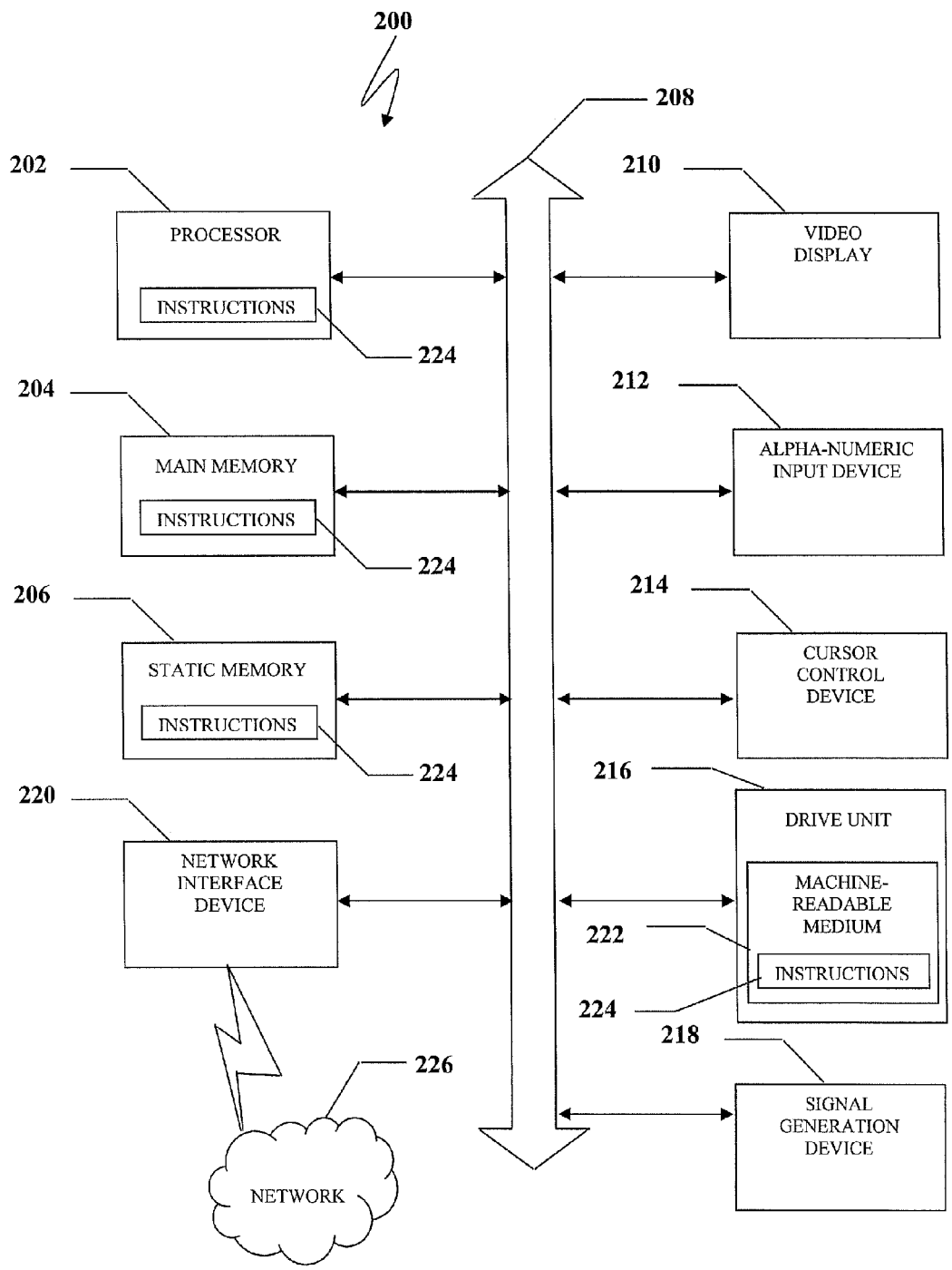
FIG. 2 depicts a machine for performing functions disclosed in an illustrative embodiment.

FIG. 2 is a diagrammatic representation of a machine in the form of a computer system 200 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 200 may include a processor 202 (e.g., a central processing unit (CPU), a graphics processing unit (GPU), or both), a main memory 204 and a static memory 206, which communicate with each other via a bus 208. The computer system 200 may further include a video display unit 210 (e.g., liquid crystals display (LCD), a flat panel, a solid state display, or a cathode ray tube (CRT)). The computer system 200 may include an input device 212 (e.g., a keyboard), a cursor control device 214 (e.g., a mouse), a disk drive unit 216, a signal generation device 218 (e.g., a speaker or remote control) and a network interface.

The disk drive unit 216 may include a machine-readable medium 222 on which is stored one or more sets of instructions (e.g., software 224) embodying any one or more of the methodologies or functions described herein, including those methods illustrated in herein above. The instructions 224 may also reside, completely or at least partially, within the main memory 204, the static memory 206, and/or within the processor 202 during execution thereof by the computer system 200. The main memory 204 and the processor 202 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 224, or that which receives and executes instructions 224 from a propagated signal so that a device connected to a network environment 226 can send or receive voice, video or data, and to communicate over the network 226 using the instructions 224. The instructions 224 may further be transmitted or received over a network 226 via the network interface device 220. The machine readable medium may also contain a data structure for containing data useful in providing a functional relationship between the data and a machine or computer in an illustrative embodiment of the disclosed system and method.

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the invention is considered to include any one or more of a tangible machine-readable medium or a tangible distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer readable medium containing instructions for execution by a computer, the computer program comprising:

instructions to detect a noise level on a conference telephone call;

instructions to reconnect a first end user device to a first data line and sending a message to the first end user device indicating that the first end user device is a source of the noise level and to reconnect to a conference server using a second end user device in response to determining that the noise level is reduced by disconnecting the first end user device from the first data line;

instructions to reconnect the first end user device to the first data line and determining if the noise level is reduced in response to determining that the noise level is not reduced by disconnecting the first end user device from the first data line;

instructions to disconnect a first conference port from the conference server;

instructions to measure the noise level for a participant on a first connection between the first conference port and the server and rerouting the first end user device to a second conference port in response to determining that the noise level is not reduced by reconnecting the first end user device to the first data line; and instructions to reroute the first end user device connection to a second conference port on the first conference server in response to determining that the noise level is not reduced by disconnecting the first conference port from the conference server.

2. The medium of claim 1, the computer program further comprising:

instructions to establish via a first conference server, a plurality of end user device connections between a plurality of end user devices and a plurality of conference ports, wherein each of the plurality of conference ports are in data communication with the conference server; and instructions to measure level noise level on each one of the end user device connections.

3. The medium of claim 2, the computer program further comprising:

instructions to detect a noisy end user device connection having the noise level above a threshold level on at least one of the end user device connections;

instructions to execute predetermined mitigation steps to reduce the noise from the noisy end user device connection, wherein each of the end user device connections comprises a first data line between a first device of the plurality of end user devices and a first port of the plurality of conference ports and a second data line between the first port of the plurality of conference ports and the first conference server; and instructions to disconnect the first end user device from the first data line.

4. The medium of claim 2, the computer program further comprising:

instructions to play an announcement on the plurality of end user devices requesting a period of silence before the measuring the noise on the plurality of end user device connections.

5. The medium of claim 2, the computer program further comprising:

instructions to play an announcement on the plurality of end user devices announcing that the measuring noise is complete and withdrawing a request for a period of silence.

6. The medium of claim 1, the computer program further comprising:

instructions to accept a user input datum from one of the end user devices at the conference server requesting noise control on the conference bridge telephone call.

7. The medium of claim 1, wherein the measuring the noise level is performed by an electronic device.

8. The medium of claim 1, wherein the measuring the noise level is evaluated by at least one of a first person listening to a first one of the plurality of end user devices and a second person listening to a second one of the plurality of end user devices.

9. A method for detecting a noise level on a conference telephone call, the method comprising:

reconnecting a first end user device to a first data line and sending a message to the first end user device indicating that the first end user device is a source of the noise level and to reconnect to a conference server using a second end user device in response to determining that the noise level is reduced by disconnecting the first end user device from the first data line;

reconnecting the first end user device to the first data line and determining if the noise level is reduced in response to determining that the noise level is not reduced by disconnecting the first end user device from the first data line;

disconnecting a first conference port from the conference server;

measuring the noise level for a participant on a first connection between the first conference port and the server and rerouting the first end user device to a second conference port in response to determining that the noise level is not reduced by reconnecting the first end user device to the first data line; and rerouting the first end user device connection to a second conference port on the first conference server in response to determining that the noise level is not reduced by disconnecting the first conference port from the conference server.

10. The method of claim 9, the method further comprising:

establishing via a first conference server, a plurality of end user device connections between a plurality of end user devices and a plurality of conference ports, wherein each of the plurality of conference ports are in data communication with the conference server; and measuring the noise level on each one of the end user device connections.

11. The method of claim 10, the method further comprising:

detecting a noisy end user device connection having the noise level above a threshold level on at least one of the end user device connections;

executing predetermined mitigation steps to reduce the noise from the noisy end user device connection, wherein each of the end user device connections comprises a first data line between a first device of the plurality of end user devices and a first port of the plurality of conference ports and a second data line between the first port of the plurality of conference ports and the first conference server; and disconnecting the first end user device from the first data line.

12. The method of claim 10, the method further comprising:

playing an announcement on the plurality of end user devices requesting a period of silence before the measuring the noise on the plurality of end user device connections.

13. The method of claim 10, the method further comprising:
    playing an announcement on the plurality of end user devices announcing that the measuring noise is complete and withdrawing a request for a period of silence.

14. The method of claim 9, the method further comprising:
    accepting a user input datum from one of the end user devices at the conference server requesting noise control on the conference bridge telephone call.

15. The method of claim 9, wherein the measuring the noise level is performed by an electronic device.

16. The method of claim 9, wherein the measuring the noise level is evaluated by at least one of a first person listening to a first one of the plurality of end user devices and a second person listening to a second one of the plurality of end user devices.

17. A system, the system comprising:
    a processor in data communication with a non-transitory computer readable medium, the non-transitory computer readable medium containing instructions for execution by the processor, the computer program comprising:
    instructions to detect a noise level on a conference telephone call;
    instructions to reconnect a first end user device to a first data line and sending a message to the first end user device indicating that the first end user device is a source of noise and to reconnect to a conference server using a second end user device in response to determining that the noise level is reduced by disconnecting the first end user device from the first data line;
    instructions to reconnect the first end user device to the first data line and determining if the noise level is reduced in response to determining that the noise is not reduced by disconnecting the first end user device from the first data line;
    instructions to disconnect a first conference port from the conference server;
    instructions to measure the noise level for a participant on a first connection between the first conference port and the server and rerouting the first end user device to a second conference port in response to determining that the noise level is not reduced by reconnecting the first end user device to the first data line; and
    instructions to reroute the first end user device connection to a second conference port on the first conference server in response to determining that the noise level is not reduced by disconnecting the first conference port from the conference server.

18. The system of claim 17, the computer program further comprising:
    instructions to establish via a first conference server, a plurality of end user device connections between a plurality of end user devices and a plurality of conference ports, wherein each of the plurality of conference ports are in data communication with the conference server; and
    instructions to measure the noise level on each one of the end user device connections.

19. The system of claim 18, the computer program further comprising:
    instructions to detect a noisy end user device connection having the noise level above a threshold level on at least one of the end user device connections;
    instructions to execute predetermined mitigation steps to reduce the noise from the noisy end user device connection, wherein each of the end user device connections comprises a first data line between a first device of the plurality of end user devices and a first port of the plurality of conference ports and a second data line between the first port of the plurality of conference ports and the first conference server; and
    instructions to disconnect the first end user device from the first data line.

20. The system of claim 18, the computer program further comprising:
    instructions to play an announcement on the plurality of end user devices requesting a period of silence before the measuring the noise on the plurality of end user device connections.

* * * * *